(No Model.)

F. PEARCE.
REVOLVING SHOW STAND.

No. 459,592. Patented Sept. 15, 1891.

Witnesses
Chas. H. Smith
J. Staib

Inventor
Frederick Pearce
per Lemuel W. Serrell
atty

THE NORRIS PETERS CO., PHOTO-LITHO., WASHINGTON, D. C.

UNITED STATES PATENT OFFICE.

FREDERICK PEARCE, OF NEW YORK, N. Y.

REVOLVING SHOW-STAND.

SPECIFICATION forming part of Letters Patent No. 459,592, dated September 15, 1891.

Application filed January 6, 1891. Serial No. 376,854. (No model.)

*To all whom it may concern:*

Be it known that I, FREDERICK PEARCE, a citizen of the United States, residing at the city and State of New York, have invented an Improvement in Revolving Show-Stands, of which the following is a specification.

In Letters Patent No. 253,757 a revolving show-stand is supported by a stationary column, there being a tube that surrounds the column, and is provided with a pointed screw at the upper end, forming a pivot that passes into a conical recess at the upper end of the column, and there are rollers around the lower part of the column and within a tubular enlargement or case connected with the tube.

In my present invention the rollers are applied to the tube that is revolved around the column, and these rollers are adjustable, so as to compensate wear, and at the same time the parts of the show-stand can be so varied in relation to the axis of rotation as to balance such show-stand and render the movement uniform, and the show-stand itself can be lifted off from the motor in order that such show-stand may be removed to a convenient position for changing or arranging the articles displayed upon such show-stand.

Figure 1:
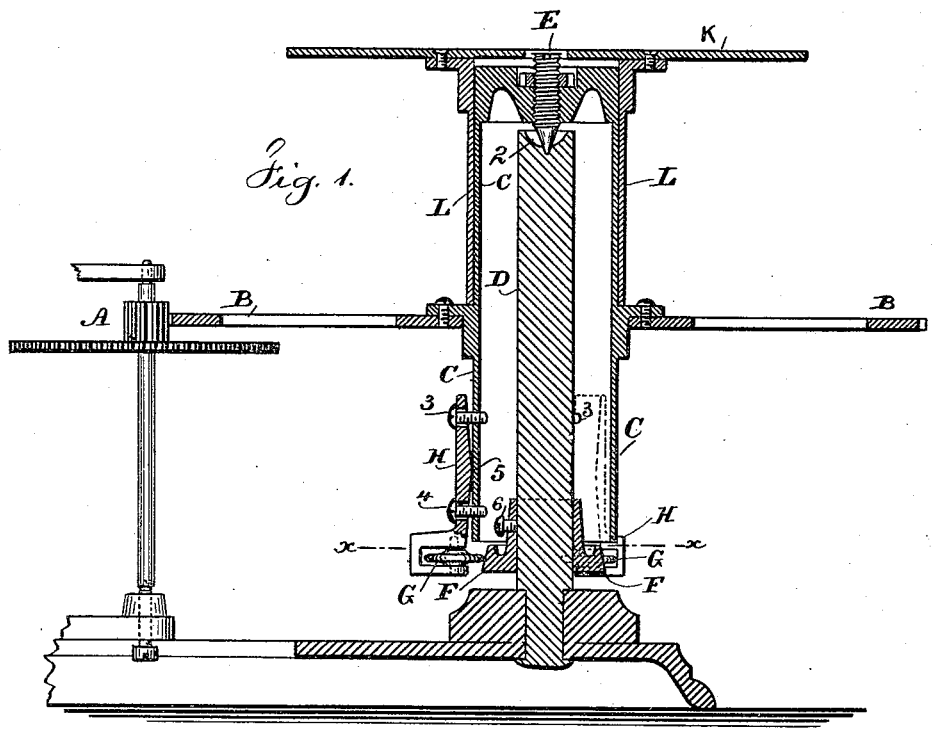
Figure 2:
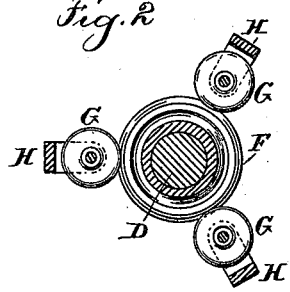

In the drawings, Figure 1 is a vertical section of the show-stand base and the supporting-column and rollers, and Fig. 2 is a sectional plan view at the line $x \, x$.

The motive power may be derived from an electro-magnet or otherwise, and at A, I have represented a pinion to be revolved by power and act upon the gear-wheel B, and there is a tube or sleeve C surrounding loosely the stationary column D, and there is a pivot-screw E passing through the top of the tube C and entering a conical recess 2 in the top of the column D, and around the base of the column there is a fixed ring F, forming a bearing against which the rollers G travel. It is preferable to provide three of these rollers G, and each roller is supported by a stock H, having at one end a jaw for receiving the roller and screws 3 and 4 for adjusting the stock, there being a pivotal bearing-place at 5 upon the stock H between the screws 3 and 4, so that by adjusting these screws 3 and 4 the rollers G will be brought to bear properly against the fixed ring F to compensate wear or looseness or to bring the axis of the show-stand into line with the axis of the column D and sleeve C.

The base-plate K of the show-stand is to be of any desired size or shape. It is preferably flat and circular, and to its under side is connected the tube L, which forms a socket passing over the upper part of the tube or sleeve C, and the lower end of the tubular socket rests upon the gear-wheel B or its hub, and the show-stand, which is made of wood or any suitable material, is fastened to the base-plate K and rises above the same. Hence the tubular socket L properly supports the show-stand; but the socket may be lifted off the sleeve C with facility, so as to move the show-stand to a convenient place for changing or arranging the articles exhibited upon such show-stand, and when this has been done the tubular socket L is returned to its normal position around the upper end of the tube or sleeve C, and the parts are in position for rotating the show-stand by suitable power applied to the gear-wheel B, and by adjusting the stocks H and rollers G the entire show-stand can be caused to revolve accurately about its axis and differences in the construction of the show-stand or in the placing of articles upon the same can be readily compensated to balance the show-stand and cause it to revolve around its center of gravity with accuracy.

It is preferable to make the ring F conical upon its exterior surface and to secure the same upon the column D by a clamping-screw 6. This conical ring can be raised or lowered as required from time to time, so as to bring a different surface into contact with the rollers G, and the wear may be partially or wholly compensated by this conical ring, so that looseness in the stand will be prevented, and in cases where the adjustment by the rising of the conical ring F is sufficient the stocks H for the rollers G may be permanently fixed to the tube C.

I claim as my invention—

1. The combination, with the fixed column D, and tube or sleeve surrounding the same, and the pivotal bearing between the upper end of the tube or sleeve and the column, of rollers and supports for the same upon the tubular sleeve, and a fixed ring or bearing upon the column for the rollers to rest against, substantially as set forth.

2. The combination, with the column having a circular ring or fixed bearing near the lower part, of the tube or sleeve around the column, a pivot at the upper end of the column supporting the tube or sleeve, the rollers G, the stocks H, carrying the rollers, and screws for connecting the stocks to the sleeve and for adjusting the stocks and rollers to their proper position, substantially as set forth.

3. The combination, with the column and its ring F near the lower end, of the tube or sleeve C around the column, the rollers G, the stocks H, carrying the rollers and having bearings 5 placed at equal distances around the sleeve, and the adjusting-screws for attaching the stocks to the sleeve and regulating the position of the stocks and rollers, substantially as set forth.

4. The combination, with the wheel B and a central tube or sleeve with which it is connected, of the stationary column within the sleeve, a pivot at the upper end of such column and connected with the sleeve, a show-stand having a base-plate K, and the tubular socket L, connected centrally to the base-plate and surrounding and removable from the upper part of the tube or sleeve C, substantially as set forth.

5. The combination, with the column D and tubular sleeve C, surrounding the same, of the rollers G and the stock for carrying such rollers connected to the sleeve, and the conical ring F around the column and against which the rollers G travel, substantially as set forth.

Signed by me this 2d day of January, 1891.

FREDERICK PEARCE.

Witnesses:
GEO. T. PINCKNEY,
HAROLD SERRELL.